(12) United States Patent
Rathonyi et al.

(10) Patent No.: US 10,939,475 B2
(45) Date of Patent: Mar. 2, 2021

(54) CARRIER CONFIGURATION FOR RANDOM ACCESS

(71) Applicant: Telefonaktiebolaget LM Ericsson (publ), Stockholm (SE)

(72) Inventors: Béla Rathonyi, Lomma (SE); Andreas Höglund, Solna (SE); Ali Nader, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/562,060

(22) PCT Filed: Aug. 14, 2017

(86) PCT No.: PCT/SE2017/050821
§ 371 (c)(1),
(2) Date: Sep. 27, 2017

(87) PCT Pub. No.: WO2018/030952
PCT Pub. Date: Feb. 15, 2018

(65) Prior Publication Data
US 2018/0249511 A1    Aug. 30, 2018

Related U.S. Application Data

(60) Provisional application No. 62/374,736, filed on Aug. 12, 2016.

(51) Int. Cl.
*H04W 74/08* (2009.01)
*H04W 74/00* (2009.01)
(Continued)

(52) U.S. Cl.
CPC ......... *H04W 74/0841* (2013.01); *H04J 1/065* (2013.01); *H04W 4/70* (2018.02); *H04W 74/006* (2013.01); *H04W 74/008* (2013.01)

(58) Field of Classification Search
CPC combination set(s) only.
See application file for complete search history.

(56) References Cited

U.S. PATENT DOCUMENTS

| 2008/0232317 A1 | 9/2008 | Jen |
| 2012/0063302 A1 | 3/2012 | Damnjanovic et al. |

(Continued)

FOREIGN PATENT DOCUMENTS

| KR | 101488269 B1 | 1/2015 |
| WO | 2013006111 A1 | 1/2013 |

OTHER PUBLICATIONS

Vodafone et al., "New work item proposal: Enhancements of NB-IoT", 3GPP TSG RAN Meeting #72, Jun. 13-16, 2016, pp. 1-8, Busan, Korea, RP-161324.

(Continued)

*Primary Examiner* — Yee F Lam
(74) *Attorney, Agent, or Firm* — Coats & Bennett, PLLC

(57) ABSTRACT

A wireless device is configured to perform a random access procedure for random access by the wireless device to a wireless communication system. The random access procedure includes multiple messages in sequence. The wireless device is configured to determine a carrier on which a downlink message in the random access procedure is to be received by the wireless device, from amongst multiple different carriers which are configurable as said carrier, based on configuration information received from a radio network node indicating said carrier. The downlink message occurs in the random access procedure subsequent to an initial message in the sequence. The wireless device is also configured to receive the downlink message on the determined carrier.

22 Claims, 9 Drawing Sheets

(51) Int. Cl.
*H04W 4/70* (2018.01)
*H04J 1/06* (2006.01)

(56) References Cited

U.S. PATENT DOCUMENTS

| | | |
|---|---|---|
| 2016/0150571 A1 | 5/2016 | Pelletier et al. |
| 2017/0238284 A1* | 8/2017 | Tseng .................... H04L 5/0091 370/329 |
| 2017/0251443 A1* | 8/2017 | Shin ...................... H04L 5/0098 |
| 2017/0251455 A1* | 8/2017 | Shin .................. H04W 56/0015 |

OTHER PUBLICATIONS

3rd Generation Partnership Project, "Technical Specification Group Radio Access Network; Evolved Universal Terrestrial Radio Access (E-UTRA); Radio Resource Control (RRC); Protocol specification (Release 13)", 3GPP TS 36.331 V13.2.0, Jun. 2016, pp. 1-623.
Ericsson (Rapporteur), "Introduction of NB-IoT in 36.321", 3GPP TSG-RAN2 Meeting~ #94, May 23-27, 2016, pp. 1-32, Nanjing, China, R2-164521.

* cited by examiner

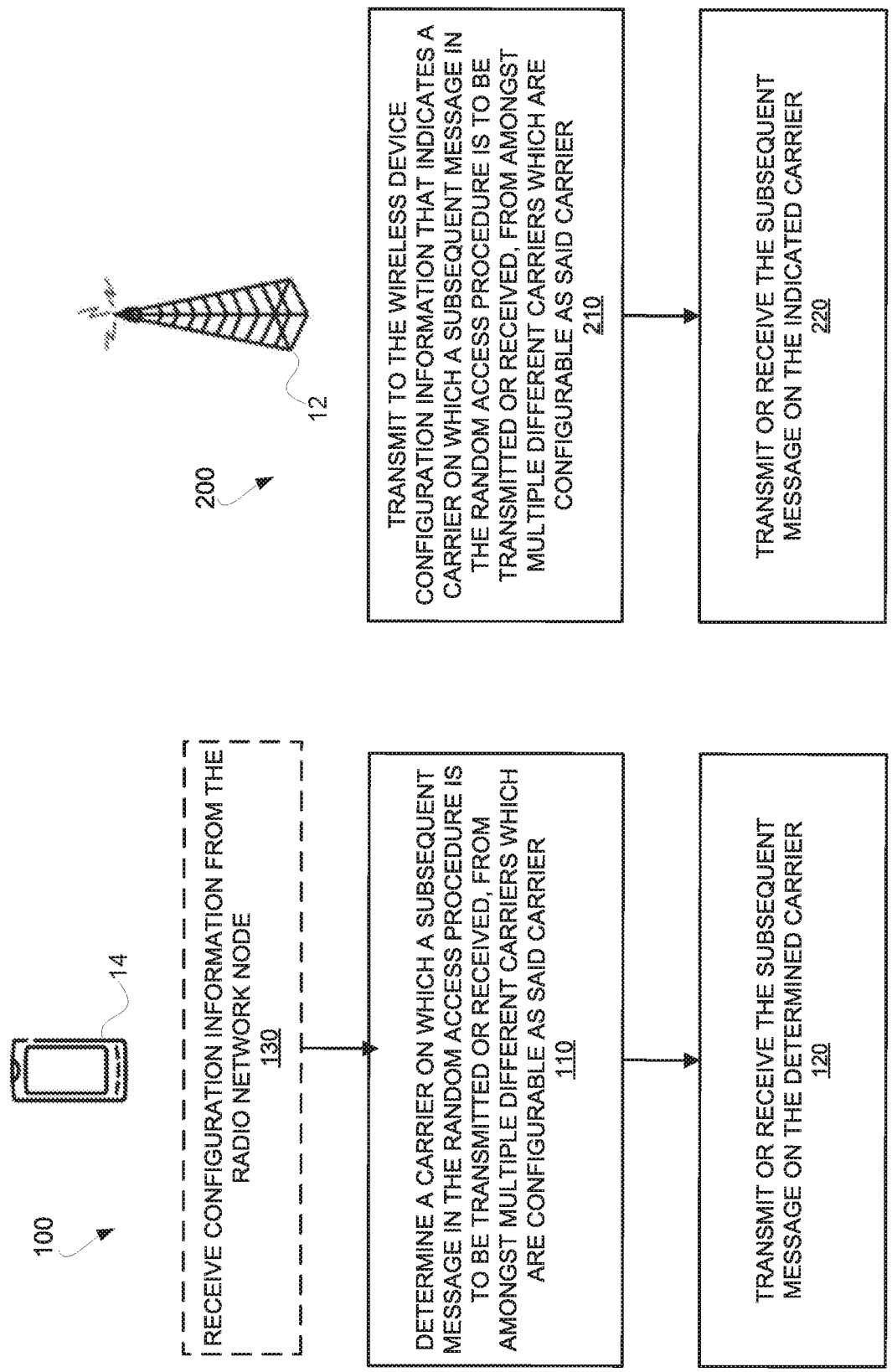

```
NPRACH-ParametersList-NB-r13 ::=     SEQUENCE (SIZE (1..maxNPRACH-Resources-
NB-r13)) OF NPRACH-Parameters-NB-r13

NPRACH-Parameters-NB-r13::=     SEQUENCE {
    nprach-Periodicity-r13                  ENUMERATED {ms40, ms80, ms160, ms240,
                                            ms320, ms640, ms1280, ms2560},
    nprach-StartTime-r13                    ENUMERATED {ms8, ms16, ms32, ms64,
                                            ms128, ms256, ms512, ms1024},
    nprach-SubcarrierOffset-r13             ENUMERATED {n0, n12, n24, n36, n2,
n18, n34, spare1},
    nprach-NumSubcarriers-r13               ENUMERATED {n12, n24, n36, n48},
    nprach-SubcarrierMSG3-RangeStart-r13    ENUMERATED {zero, oneThird,
twoThird, one},
    maxNumPreambleAttemptCE-r13             ENUMERATED {n3, n4, n5, n6, n7,
n8, n10, spare1},
    numRepetitionsPerPreambleAttempt-r13    ENUMERATED {n1, n2, n4, n8, n16,
n32, n64, n128},
    npdcch-NumRepetitions-RA-r13            ENUMERATED {r1, r2, r4, r8, r16, r32,
r64, r128,
                                            r256, r512, r1024, r2048,
                                            spare4, spare3, spare2, spare1},
    npdcch-StartSF-CSS-RA-r13               ENUMERATED {v1dot5, v2, v4, v8, v16,
v32, v48, v64},
    npdcch-Offset-RA-r13                    ENUMERATED {zero, oneEighth, oneFourth,
threeEighth}
}
```

*FIGURE 8*

```
NPRACH-ParametersNonAnchorList-NB-r14 ::=    SEQUENCE (SIZE (1..maxNPRACH-NonAnchorResources-NB-r14)) OF NPRACH-
                                             ParametersNonAnchor-NB-r14

UL-NonAnchorCarrierConfigList-NB-r14 :: = SEQUENCE (SIZE (1..maxUL-NonAnchorCarriers-NB-r14)) OF UL-CarrierConfigDedicated-NB-r13
DL-NonAnchorCarrierConfigList-NB-r14 ::= SEQUENCE (SIZE (1..maxUL-NonAnchorCarriers-NB-r14)) OF DL-CarrierConfigDedicated-NB-r13

NPRACH-ParametersNonAnchor-NB-r14::=         SEQUENCE (
 ul-NonAnchorCarrierConfigIndex-r14              INTEGER (1..maxUL-NonAnchorCarriers-NB-r14),
 dl-NonAnchorCarrierConfigIndex-r14              INTEGER (1..maxDL-NonAnchorCarriers-NB-r14)
                                                 OPTIONAL,    -- Need ON nprach-AnchorCarrierResourceIndex-r14           INTEGER (1..maxNPRACH-Resources-NB-r13),
 nprach-Periodicity-r14                          ENUMERATED {ms40, ms80, ms160, ms240,
                                                 ms320, ms640, ms1280, ms2560, ms2560}
                                                 OPTIONAL, -- Need ON
 nprach-StartTime-r14                    ENUMERATED {ms8, ms16, ms32, ms64,
                                                 ms128, ms256, ms512, ms1024}
                                                 OPTIONAL, -- Need ON
 nprach-SubcarrierOffset-r14                     ENUMERATED {n0, n12, n24, n36, n2, n18, n34,
                                                 spare1} OPTIONAL, -- Need ON
 nprach-NumSubcarriers-r14                       ENUMERATED {n12, n24, n36, n48}
                                                 OPTIONAL, -- Need ON
 nprach-SubcarrierMSG3-RangeStart-r14            ENUMERATED {zero, oneThird, twoThird, one}
                                                 OPTIONAL, -- Need ON
 maxNumPreambleAttemptCE-r14                     ENUMERATED {n3, n4, n5, n6, n7, n8, n10, spare1}
                                                 OPTIONAL, -- Need ON
 numRepetitionsPerPreambleAttempt-r14            ENUMERATED {n1, n2, n4, n8, n16, n32, n64, n128}
                                                 OPTIONAL, -- Need ON
 npdcch-NumRepetitions-RA-r14                    ENUMERATED {r1, r2, r4, r8, r16, r32, r64, r128,
                                                 r256, r512, r1024, r2048,
                                                 spare4, spare3, spare2, spare1}
                                                 OPTIONAL, -- Need ON
 npdcch-StartSF-CSS-RA-r14                       ENUMERATED {v1dot5, v2, v4, v8, v16, v32, v48,
                                                 v64} OPTIONAL,    -- Need ON
 npdcch-Offset-RA-r14                            ENUMERATED {zero, oneEighth, oneFourth,
                                                 threeEighth} OPTIONAL, -- Need ON
```

*FIGURE 9*

CARRIER CONFIGURATION FOR RANDOM ACCESS

RELATED APPLICATIONS

This application claims priority to U.S. Provisional Patent Application Ser. No. 62/374,736 filed Aug. 12, 2016, the entire contents of which are incorporated herein by reference.

BACKGROUND

Machine Type Communication (MTC) generally refers to devices that communicate without human interaction, i.e. devices built into machines. MTC is part of the even more general discussion of Internet of things (IoT), where it is envisioned that all devices that can benefit from being connected will be connected. Predictions for coming years' suggest that there will be a very large number of MTC devices. Many of these devices such as narrowband IoT (NB-IoT) devices will probably be fairly stationary, e.g. the device is located in a vending machine and perhaps even built into walls. These devices are meant to last many years and operate without chargers.

For example, the NB-IoT system which is based on existing Long Term Evolution (LTE) systems and addresses optimized network architecture and improved indoor coverage for massive number of devices is designed for the following characteristics: low throughput devices (e.g. 2 kbps), low delay sensitivity (~10 seconds), ultra-low device cost (below 5 dollars), and low device power consumption (battery life of 10 years). It is envisioned that each cell (~1 $km^2$) in this system will serve many thousand devices such as sensors, meters, actuators, and alike. In order to be able to make use of existing spectrum for, e.g. GSM, a fairly narrow bandwidth has been adopted for NB-IoT technology; namely, 180 KHz, which is the same as one LTE physical resource block (PRB). The NB-IoT radio frame length is same as in LTE; i.e. 10 ms and consists of 10 subframes. The narrowband primary synchronization signal (NPSS) is transmitted in subframe number 5.

For Frequency Division Duplexing (FDD) mode of NB-IoT (i.e. the transmitter and the receiver operate at different carrier frequencies) only half-duplex mode needs to be supported in the user equipment (UE). In order to achieve improved coverage, data repetition is used both in uplink (UL) and/or downlink (DL). The lower complexity of the devices (e.g. only one transmission/receiver chain) means that some repetition might be needed also in normal coverage.

Further, to alleviate UE complexity, the working assumption is to have cross-subframe scheduling. That is, a transmission is first scheduled on a Physical DL Control Channel (NPDCCH) and then the first transmission of the actual data on the Physical DL Shared Channel (NPDSCH) is carried out after the final transmission of the NPDCCH. Similarly, for UL data transmission, information about resources scheduled by the network and needed by the UE for UL transmission is first conveyed on the NPDCCH and then the first transmission of the actual data by the UE on the Physical UL Shared Channel (NPUSCH) is carried out after the final transmission of the NPDCCH. In other words, for both cases above, there is no simultaneous reception of control channel and reception/transmission of data channel from the UE's perspective.

Furthermore, not all the subframes are available for dedicated data communication in DL in an NB-IoT cell. The amount of available subframes in the DL is dependent on one of the three operation modes (i.e. Stand-alone, In-band, and Guard-band) NB-IoT is deployed in. For all operation modes, a UE needs to rate-match around the following non-available subframes (or parts of subframe): (i) The NB-IoT primary and secondary synchronization channels (NPSS, and NSSS), where NPSS is transmitted every radio frame and NSSS transmission cycle is every other frame; (ii) The NB-IoT broadcast channel (NPBCH) containing the Master Information Block (MIB) occupies subframe 0 in every radio frame; (iii) The NB-IoT system information blocks broadcast on NPDSCH (e.g. NSIB1 broadcast in subframe 4 of every other radio frame); (iv) DL gaps when configured; (v) NB-IoT reference symbols (NRS); and, in addition in the case in-band operation mode, (vi) LTE reference symbols such as cell-specific reference signal (CRS) and positioning reference signal (PRS), and LTE multicast broadcast single frequency network (MBSFN) subframes.

Due to the nature of NB-IoT with half-duplex communication, cross-subframe scheduling, low bandwidth, the available amount of subframes, and the amount of UEs to be served, it becomes evident that, as all other communication systems, NB-IoT will naturally benefit from utilizing more spectrum for efficient operation, especially if such spectrum is already available (e.g. in an in-band operation mode during low traffic hours when LTE carrier is not fully used). Therefore, in 3GPP Rel-13, NB-IoT multi-carrier operation has been adopted where the UE operating in an NB-IoT anchor carrier is configured through higher layer signaling (Layer 3 radio resource control, RRC) to operate on an NB-IoT non-anchor carrier during connected mode operation. At the end of the connected mode operation, the UE autonomously returns back to the anchor carrier (when released/suspended by the eNB to idle mode). Note that the non-anchor carrier does not have the requirement to be deployed on the 100 kHz raster; i.e. any LTE in-band PRB can be used as non-anchor In NB-IoT, random access serves multiple purposes such as initial access when establishing a radio link and scheduling request. Among others, one main objective of random access is to achieve uplink synchronization, which is important for maintaining uplink orthogonality in NB-IoT. Similar to LTE, the contention-based random access procedure in NB-IoT consists of four steps: (1) UE transmits a random access preamble as the initial message of the procedure; (2) the network transmits a random access response that contains a timing advance command and scheduling of uplink resources for the UE to use in the third step; (3) the UE transmits its identity to the network using the scheduled resources; and (4) the network transmits a contention resolution message to resolve any contention due to multiple UEs transmitting the same random access preamble in the first step.

To serve UEs in different coverage classes that have different ranges of path loss, the network can configure up to three narrowband physical random access channel (NPRACH) resource configurations in a cell. Each NPRACH resource configuration defines an NPRACH resource usable for random access. In each configuration, a repetition value is specified for repeating a basic random access preamble. A UE measures its downlink received signal power to estimate its coverage level, and transmits random access preamble in the NPRACH resources configured for its estimated coverage level. To facilitate NB-IoT deployment in different scenarios, NB-IoT allows flexible configuration of NPRACH resources in a time-frequency resource grid with the following parameters: (i) Time domain: periodicity of NPRACH resource, and starting time of NPRACH resource in a period; and (ii) Frequency domain: frequency location (in terms of subcarrier offset), and number of subcarriers.

According to 3GPP Rel-13, in connected mode, all Random Access (RA) attempts are to be performed on the anchor carrier. After the contention resolution (Msg4), either the UE goes back to the carrier that was serving it autonomously or the network provides an explicit configuration to the UE steering it to another carrier.

SUMMARY

According to some embodiments herein, it is configurable on which carrier a non-initial message in a random access procedure is transmitted or received. This non-initial message may be a subsequent message that occurs subsequently to an initial message in the random access procedure. The subsequent message may be for instance a downlink message or an uplink message, such as Message 2, 3 or 4 in an LTE-based random access procedure (e.g., a random access response, an RRC connection request, or a contention resolution message). Regardless, according to this configurability, the subsequent message in some embodiments may be communicated on a non-anchor carrier.

Generally, embodiments herein include a method of performing a random access procedure for random access by a wireless device to a wireless communication system. The random access procedure includes multiple messages in sequence, e.g., including an initial message and one or more subsequent messages. The method comprises determining a carrier on which a subsequent message in the random access procedure (e.g., a downlink message) is to be transmitted or received, from amongst multiple different carriers which are configurable as said carrier. The determination may be made for instance based on configuration information received from a base station indicating said carrier. The subsequent message occurs in the random access procedure subsequent to an initial message in the sequence. Regardless, the method further comprises transmitting or receiving the subsequent message on the determined carrier.

In some embodiments, the method further comprises transmitting the initial message of the random access procedure on a random access resource. In this case, determining the carrier comprises determining the carrier on which the downlink message is to be received, based on the configuration information and the random access resource on which the initial message is transmitted.

Other embodiments herein include a method of performing a random access procedure for random access by a wireless device to a wireless communication system, wherein the random access procedure includes multiple messages in sequence. The method comprises transmitting to the wireless device configuration information that indicates a carrier on which a downlink message in the random access procedure is to be received by the wireless device, from amongst multiple different carriers which are configurable as said carrier. The downlink message occurs in the random access procedure subsequent to an initial message in the sequence. The method also comprises transmitting the downlink message on the indicated carrier.

In any of the above embodiments, the configuration information may indicate, for each of one or more random access resources usable for the initial message, a carrier to be used for the downlink message if that random access resource is used for the initial message.

In some embodiments, for example, the configuration information includes a list of one or more uplink non-anchor carrier random access resource configurations. Each uplink non-anchor carrier random access resource configuration indicates a downlink carrier configuration to be used for transmission of the downlink message if the uplink non-anchor carrier random access resource is used for transmission of the initial message. In fact, in some embodiments, an uplink non-anchor carrier configuration indicates the downlink carrier configuration to be used as being a certain downlink non-anchor carrier configuration if the uplink non-anchor carrier random access resource configuration includes an index into a list of downlink non-anchor carrier configurations and as being a downlink anchor carrier configuration if the index is absent from the uplink non-anchor carrier random access resource configuration.

Regardless, in any of the above embodiments, the configuration information may be included in broadcasted system information.

Alternatively or additionally, the downlink message in some embodiments is a random access response or a contention resolution message.

In some embodiments, the multiple different carriers include an anchor carrier and one or more non-anchor carriers. In one embodiment, an anchor carrier is a carrier on which a synchronization signal, broadcast information, and/or system information is transmitted, whereas a non-anchor carrier is a carrier that lacks a synchronization signal, broadcast information, and/or system information.

In any of the above embodiments, the wireless communication system may be a narrowband internet of things (NB-IoT) system.

Embodiment herein include corresponding apparatus, computer programs, and carriers. For example, embodiments herein also include a wireless device configured for performing a random access procedure for random access to a wireless communication system. The wireless device is configured to determine a carrier on which a downlink message in the random access procedure is to be received by the wireless device, from amongst multiple different carriers which are configurable as said carrier, based on configuration information received from a radio network node indicating said carrier. The downlink message occurs in the random access procedure subsequent to an initial message in the sequence. The wireless device is also configured to receive the downlink message on the determined carrier.

Embodiments further include a radio network node configured for performing a random access procedure for random access by a wireless device to a wireless communication system. The radio network node is configured to transmit to the wireless device configuration information that indicates a carrier on which a downlink message in the random access procedure is to be received by the wireless device, from amongst multiple different carriers which are configurable as said carrier. The radio network node is further configured to transmit the downlink message on the indicated carrier.

BRIEF DESCRIPTION OF THE DRAWINGS

FIG. 2 is a logic flow diagram of a method performed by a wireless device according to some embodiments.

FIG. 3 is a logic flow diagram of a method performed by a radio network node according to some embodiments.

FIG. 8 is a section of NPRACH configuration parameters according to some embodiments.

FIG. 9 is a section of configuration information with certain syntax according to some embodiments.

DETAILED DESCRIPTION

Figure 1:
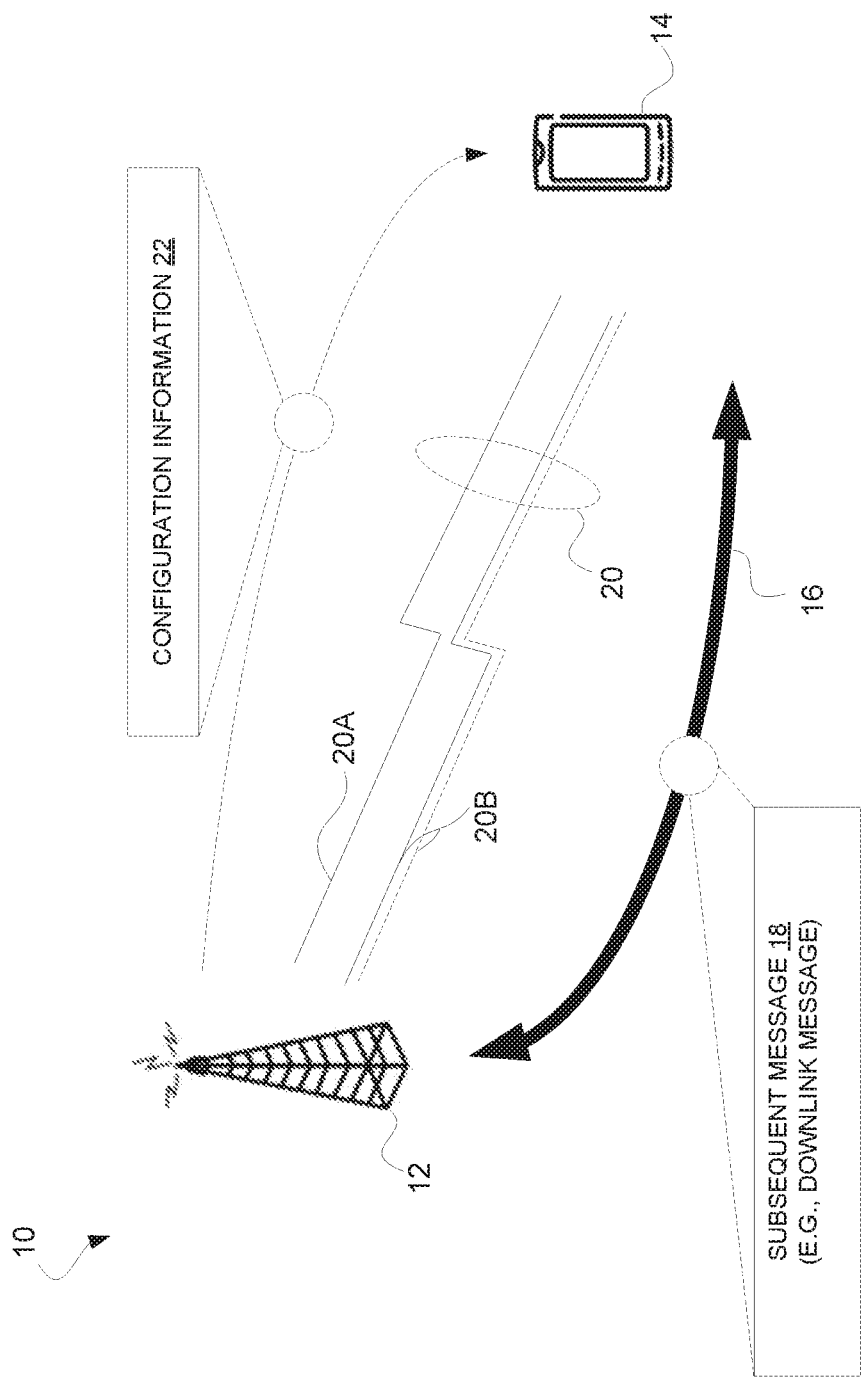
FIG. 1 is a block diagram of a wireless communication system according to some embodiments.

FIG. 1 illustrates a wireless communication system 10 (e.g., a narrowband internet-of-things, NB-IoT, system) according to some embodiments. The system 10 as shown includes a radio network node 12 (e.g., a base station) and a wireless device 14 (e.g., user equipment, UE). A random access procedure 16 is performed for random access by the wireless device 14 to the system 10, e.g., as part of initial access, uplink synchronization, etc.

The random access procedure 16 includes multiple messages in sequence. The multiple messages include an initial message (not shown) that occurs first in the sequence, as well as one or more subsequent messages that occur in the sequence subsequent to the initial message. FIG. 1 for example shows one such subsequent message 18, which may be an uplink message or a downlink message. In some embodiments, for instance, the subsequent message 18 is a random access response, a radio resource control (RRC) connection request, or a contention resolution message, e.g., so as to correspond to message 2 (Msg2), message 3 (Msg3), or message 4 (Msg4) in an LTE-based random access procedure (e.g., a NB-IoT random access procedure).

Accordingly to some embodiments, multiple different carriers 20 in the system 10 are configurable as the carrier on which the subsequent message 18 is to be transmitted or received in the random access procedure. Given this configurability, FIG. 2 illustrates processing performed by the wireless device 14 according to some embodiments.

As shown in FIG. 2, processing 100 at the wireless device 14 includes determining a carrier on which the subsequent message 18 in the random access procedure 16 is to be transmitted or received, from amongst multiple different carriers 20 which are configurable as that carrier (Block 110). That is, it is configurable on which of the multiple different carriers 20 the subsequent message 18 is transmitted or received. Processing 100 further includes transmitting or receiving the subsequent message 18 on the determined carrier (Block 120).

In some embodiments, for example as shown in FIG. 1, the wireless device 14 determines the carrier on which the subsequent message 18 is to be transmitted or received, based on configuration information 22 received from the radio network node 12 indicating that carrier. Such configuration information 22 may for instance be broadcasted system information. Regardless, in these embodiments, processing 100 in FIG. 2 may further include receiving the configuration information 22 from the radio network node 12 (Block 130). And, as shown in FIG. 3, corresponding processing 200 at the radio network node 12 may include transmitting to the wireless device 14 the configuration information 22; namely, configuration information that indicates a carrier on which the subsequent message 18 in the random access procedure 16 is to be transmitted or received, from amongst the multiple carriers 20 configurable as that carrier (Block 210). Processing 200 may further include transmitting or receiving the subsequent message 18 on the indicated carrier (Block 220).

Regardless of whether configuration information 22 is used, though, such configurability may for instance facilitate balancing the load across different carriers 20. That is, rather than the subsequent message 18 being statically defined as always being transmitted or received over a particular carrier, configuration of the carrier on which the subsequent message 18 is communicated may be dynamically adapted as needed to perform carrier load balancing.

Consider for instance that in some embodiments the carriers 20 include an anchor carrier 20A and one or more non-anchor carriers 20B, such that either an anchor carrier or a non-anchor carrier may be configured as the carrier on which the subsequent message 18 is to be transmitted. In some embodiments, the anchor carrier 20A includes one or more synchronization signals (e.g., a primary synchronization signal, PSS, and a secondary synchronization signal, SSS) and/or broadcasted system information, whereas the one or more non-anchor carriers 20B each lack such synchronization signal(s) and/or broadcasted system information.

In NB-IoT embodiments, for instance, the anchor carrier 20A is an NB-IoT anchor carrier and the non-anchor carrier(s) 20B are NB-IoT non-anchor carriers. Amongst such anchor/non-anchor carriers, there is a risk for imbalance in the amount of available resources between the downlink and the uplink. In the downlink, the anchor carrier 20A carries synchronization signal(s) such as the narrowband primary synchronization signal (NPSS) and the narrowband secondary synchronization signal (NSSS), as well as the physical broadcast channel (PBCH) and system information (SI). Also depending on the load, the anchor downlink carrier may further be heavily occupied with Msg2/Msg4 transmissions for Rel-13 wireless devices, paging related messages (on narrowband physical downlink control channel, NPDCCH, and narrowband physical downlink shared channel, NPDSCH) and unicast transmissions (on NPDCCH/NPDSCH) and hence be a bottleneck.

Accordingly, in these and other embodiments, the configurability discussed above may help balance the load across the anchor and non-anchor carriers, e.g., to account for the anchor carrier 20A having fewer available resources in the downlink. Where the subsequent message 18 is a downlink message, for instance, configuring the subsequent message 18 to be transmitted on a non-anchor carrier 20B (e.g., to a Rel-14 wireless device) may help avoid overloading the anchor carrier 20A.

Alternatively or additionally, the configurability may allow the random access procedure to be performed on carriers that are more appropriate or optimal for the channel conditions under which the procedure is being performed. In some embodiments, for example, the carrier on which the subsequent message 18 is transmitted or received may be dynamically or semi-statically configured based on the channel conditions under which the random access procedure is or will be performed. Such configuration may take into account differences that the carriers 20 may have in terms of supporting random access under certain channel conditions, e.g., as reflected by the carriers' different types, such as anchor vs. non-anchor. In some embodiments, for instance, the anchor carrier 20A is power boosted and a non-anchor carrier 20B is not power boosted, e.g., such that the anchor carrier 20A may better support random access under poor channel conditions. The same power-boosted vs. not power-boosted differentiation may similarly be drawn between different non-anchor carriers.

In these and other embodiments, configurability of the carrier on which the subsequent message 18 is transmitted or received may be controlled, governed, or otherwise influenced by configurability of the carrier (or radio resource) on which the initial message in the random access procedure is transmitted or received. In this case, then, the wireless device 14 determines the carrier on which the subsequent message 18 is transmitted or received, based on or as a function of the carrier (or radio resource) on which the initial message is transmitted or received. Consider for instance embodiments illustrated by FIG. 4 in a context where the subsequent message 18 is a downlink message on a downlink carrier.

Figure 4:
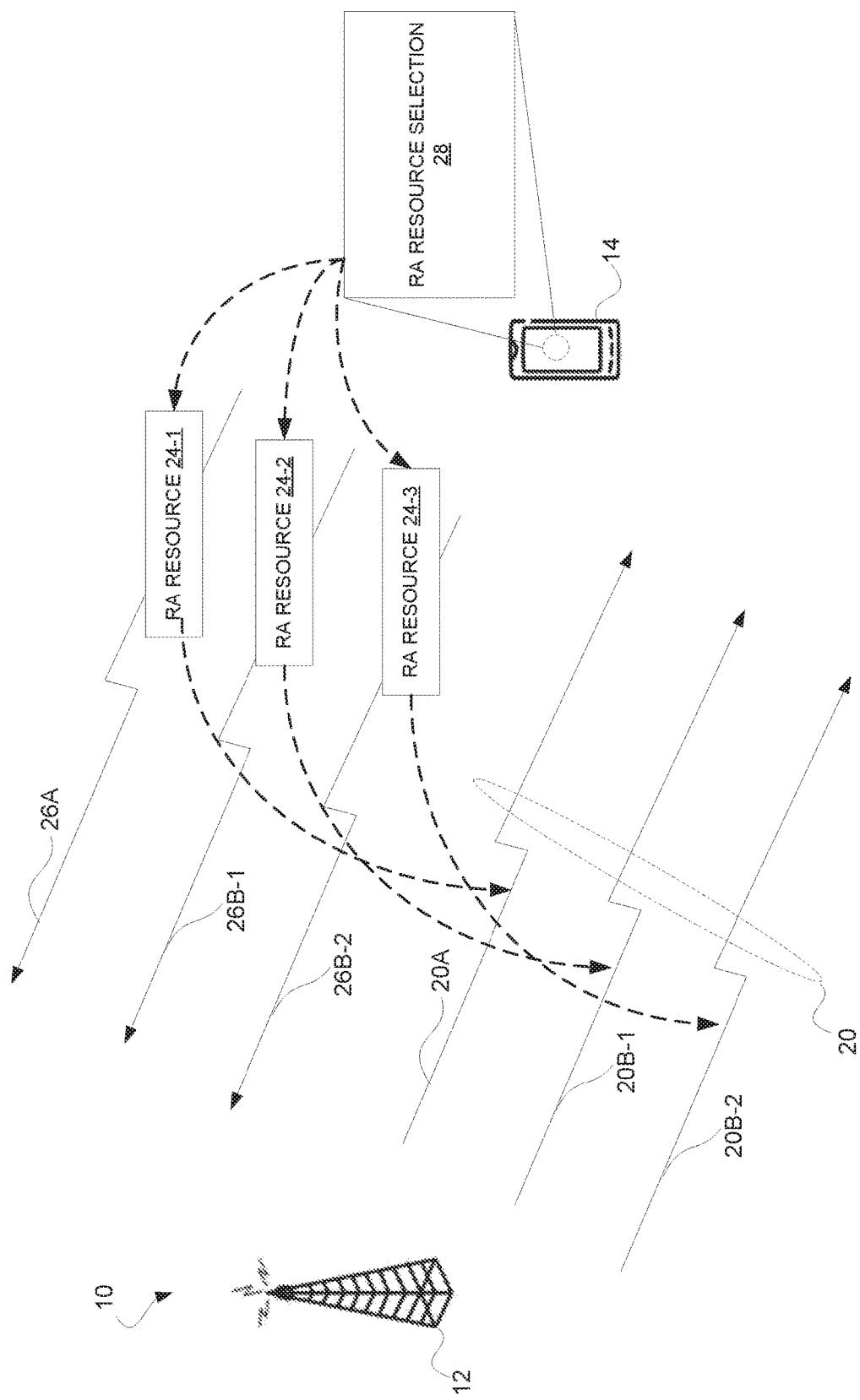
FIG. 4 is a block diagram of a wireless communication system with uplink and downlink carriers according to some embodiments.

As shown in FIG. 4, random access resources 24-1, 24-2, and 24-3 are provided on uplink carriers 26A, 26B-1, and 26B-2. These random access resources 24-1, 24-2, and 24-3 may be associated with or otherwise support different coverage levels or coverage enhancement levels (e.g., in terms of repetition numbers), e.g., so as to support transmission of the initial message under different channel conditions. In some embodiments, configuration of the downlink carrier on which the subsequent message 18 is transmitted is mapped, linked, or otherwise tied to the random access resource on which the initial message is transmitted, e.g., based on the channel condition supported by the carriers. As shown, for example, the wireless device 14 performs random access resource selection 28 in order to select one of the random access resources on which to transmit the initial message. This random access resource selection may dictate on which downlink carrier the subsequent message 18 is transmitted. Indeed, FIG. 4 shows that random access resources 24-1, 24-2, and 24-3 are respectively mapped to carriers 20A, 20B-1, and 20B-2, e.g., such that the subsequent message 18 is to be transmitted on carrier 20A, 20B-1, or 20B-2 depending respectively on whether the initial message is transmitted on random access resource 24-1, 24-2, or 24-3. Although FIG. 4 illustrates one random access resource per uplink carrier, each uplink carrier may in fact have multiple random access resources. In such a case, those random access resources are still respectively mapped to certain downlink carriers for transmission of the subsequent message 18.

Configurability of the carrier for the subsequent message 18 as a function of the random access resource for the initial message may be accomplished by the configuration information 22 in some embodiments. The configuration information 22 may for instance specify the carrier on which the subsequent message 18 is to be transmitted or received, based on or as a function of the random access resource on which the initial message is transmitted or received. Consider for instance the processing shown in FIG. 5 in a context where the subsequent message 18 is a downlink message.

Figure 5:
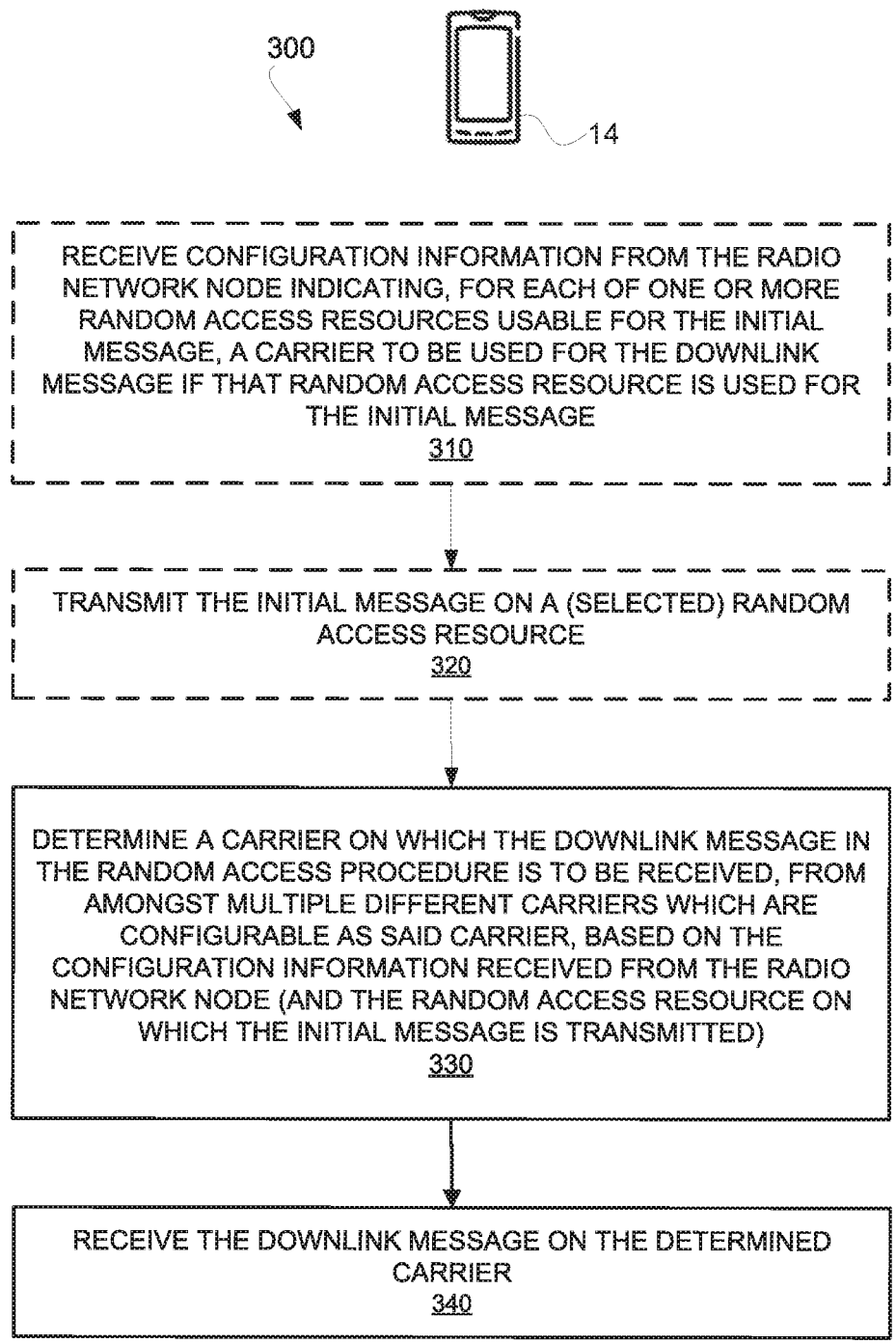
FIG. 5 is a logic flow diagram of a method performed by a wireless device according to other embodiments.

As shown in FIG. 5, processing 300 at the wireless device 14 includes determining a carrier on which the downlink message 18 in the random access procedure 16 is to be received, from amongst multiple carriers 20 which are configurable as that carrier, based on configuration information 22 received from the radio network node 12 (Block 330). Processing 300 further includes receiving the downlink message 18 on the determined carrier (Block 340). FIG. 5 also shows that, in some embodiments, processing 300 also includes receiving the configuration information 22 indicating, for each of one or more random access resources usable for the initial message, a carrier to be used for the downlink message 18 if that random access resource is used for the initial message (Block 310). In this case, then, the wireless device 14 may transmit the initial message of the random access procedure 16 on a (selected) random access resource (Block 320), and determine the carrier on which the downlink message 18 is to be received, based on both the configuration information 22 and the random access resource on which the initial message is transmitted (Block 330).

Figure 6:
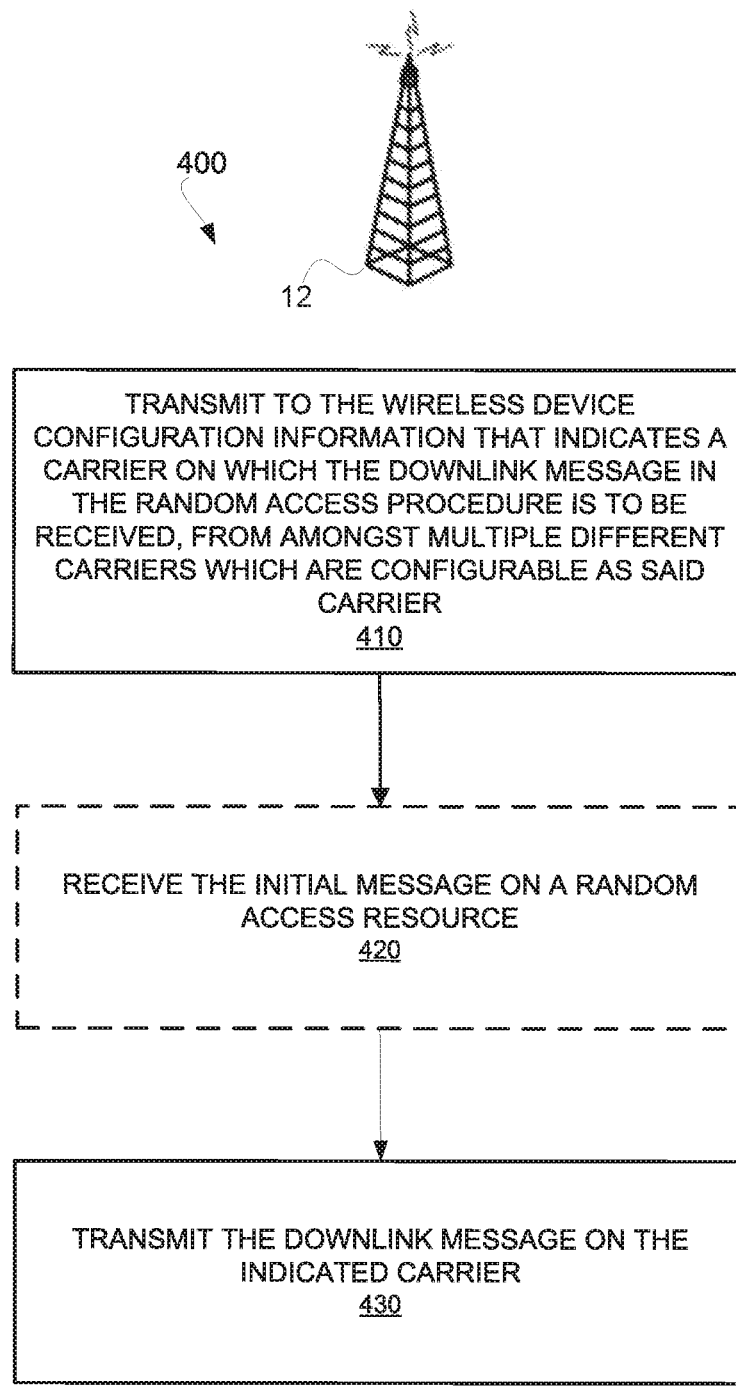
FIG. 6 is a logic flow diagram of a method performed by a radio network node according to other embodiments.

FIG. 6 shows corresponding processing 400 performed by the radio network node 12. As shown, processing 400 includes transmitting to the wireless device 14 configuration information 22 that indicates a carrier on which the downlink message 18 in the random access procedure 16 is to be received, from amongst multiple different carriers 20 which are configurable as that carrier (Block 420). Again, this configuration information 22 may indicate, for each of one or more random access resources usable for the initial message, a carrier to be used for the downlink message 18 if that random access resource is used for the initial message. Regardless, processing 400 may further include transmitting the downlink message 18 on the indicated carrier (Block 430). Processing 400 may also correspondingly include receiving the initial message on a certain random access resource (Block 410).

The configuration information 22 may indicate this in any number of ways. In some embodiments, for example, the configuration information 22 includes a list of one or more uplink non-anchor carrier random access resource configurations. An uplink non-anchor carrier random access resource configuration indicates a downlink carrier configuration to be used for transmission of the downlink message 18 if the uplink non-anchor carrier random access resource configuration is used for transmission of the initial message. This downlink carrier configuration may be the configuration for an anchor carrier or a non-anchor carrier. In fact, in some embodiments, an uplink non-anchor carrier random access resource configuration indicates the downlink carrier configuration to be used as being a certain downlink non-anchor carrier configuration if the uplink non-anchor carrier random access resource configuration includes an index into a list of downlink non-anchor carrier configurations and as being a downlink anchor carrier configuration if the index is absent from the uplink non-anchor carrier random access resource configuration.

Consider for instance the embodiments below in the context of NB-IoT. If the anchor carrier is power boosted in NB-IoT, it might be beneficial to have the downlink transmissions at least to poor coverage UEs done on the anchor carrier. It might therefore not be optimal for every NPRACH resource on a non-anchor carrier to always use the downlink anchor carrier or to have a separate downlink carrier for the random access related messages (i.e. Msg2, and Msg4). Of course, non-anchor carriers may be power boosted instead or in addition, so in general, it is beneficial for UEs in poor coverage (i.e. in high CE level) to receive Msg2/Msg4 on a power boosted DL carrier.

For unicast communication it is already in 3GPP Rel-13 possible to configure the DL and/or UL transmission of UEs to non-anchor carriers but at the earliest after the RA procedure Msg4 has been transmitted, i.e., by including the parameter physicalConfigDedicated-NB (3GPP TS 36.331 rev 13.2.0) as part of Msg4. However, during the RA procedure (Msg1, Msg2, Msg3, Msg4), no such possibility heretofore exists and therefore there is a need for configuring DL/UL carrier frequencies already before Msg5, i.e. be able to transmit also Msg2/Msg3/Msg4 on other carriers than the NB-IoT anchor carrier. Thus, according to some embodiments it is possible in the RA-related configuration broadcasted on system information (in Rel-13 done as part of SIB2-NB) to configure what DL carrier the UE for each NPRACH resource (in a cell) will receive Msg2 and Msg4 during the RA procedure. The DL carrier may either be an anchor carrier or a non-anchor carrier. Alternatively or additionally, it is possible in some embodiments to configure if Msg3 transmissions should be done on the same UL carrier as Msg1 was transmitted or on the anchor UL carrier or on another UL carrier. This may be done either as part of the broadcasted RA configuration or be part of Msg2. Similarly, it is possible in some embodiments to configure different DL carriers for Msg2 and Msg4, i.e. Msg2 on carrier X and Msg4 on carrier Y.

As part of Msg4, the UE may be directed to other UL/DL carriers as specified in 3GPP Rel-13 through a dedicated configuration, so the first message on a non-anchor carrier in Rel-13 is thus Msg5. If no dedicated configuration is provided, the UE remains on the UL carrier where Msg3 was transmitted and the DL where Msg4 was received.

According to one or more embodiments, the radio network node 12 for example configures a NB-IoT cell such that UEs in poor coverage are configured to use a power boosted DL carrier for Msg2 and Msg4 (e.g. the anchor carrier), whereas the UEs in good coverage are configured to use non-power boosted DL carriers for Msg2/Msg4. This may be achieved by indicating that the NPRACH resources selected/used by poor coverage UEs are linked/configured to the anchor carrier for Msg2/Msg4 and the NPRACH resources selected/used by good coverage UEs are linked/configured to some other (non-anchor) carrier for Msg2/Msg4. Also other configurations are of course possible and another example would be that the number of UL and DL non-anchor carriers used for a NB-IoT cell does not need to be the same and may be set based on for example the expected total cell traffic load that may be larger in UL than in DL or vice versa.

Signaling the cell configuration as part of SI may be done in different ways. In Rel-13, a list of (1-3) NPRACH resources is signaled including the NPRACH configuration including the corresponding search space configuration (for Msg2/Msg4 reception on the anchor). According to some embodiments, new parameters are signaled on SI (preferably in SIB2-NB) in order for a UE to be able to derive for each non-anchor NPRACH resource: (i) on what UL non-anchor carrier said NPRACH resource resides; and (ii) on what DL carrier Msg2 and/or Msg4 is received when said NPRACH resource is used by a UE, including information of the search space configuration (in order to decode NPDCCH).

Figure 7:
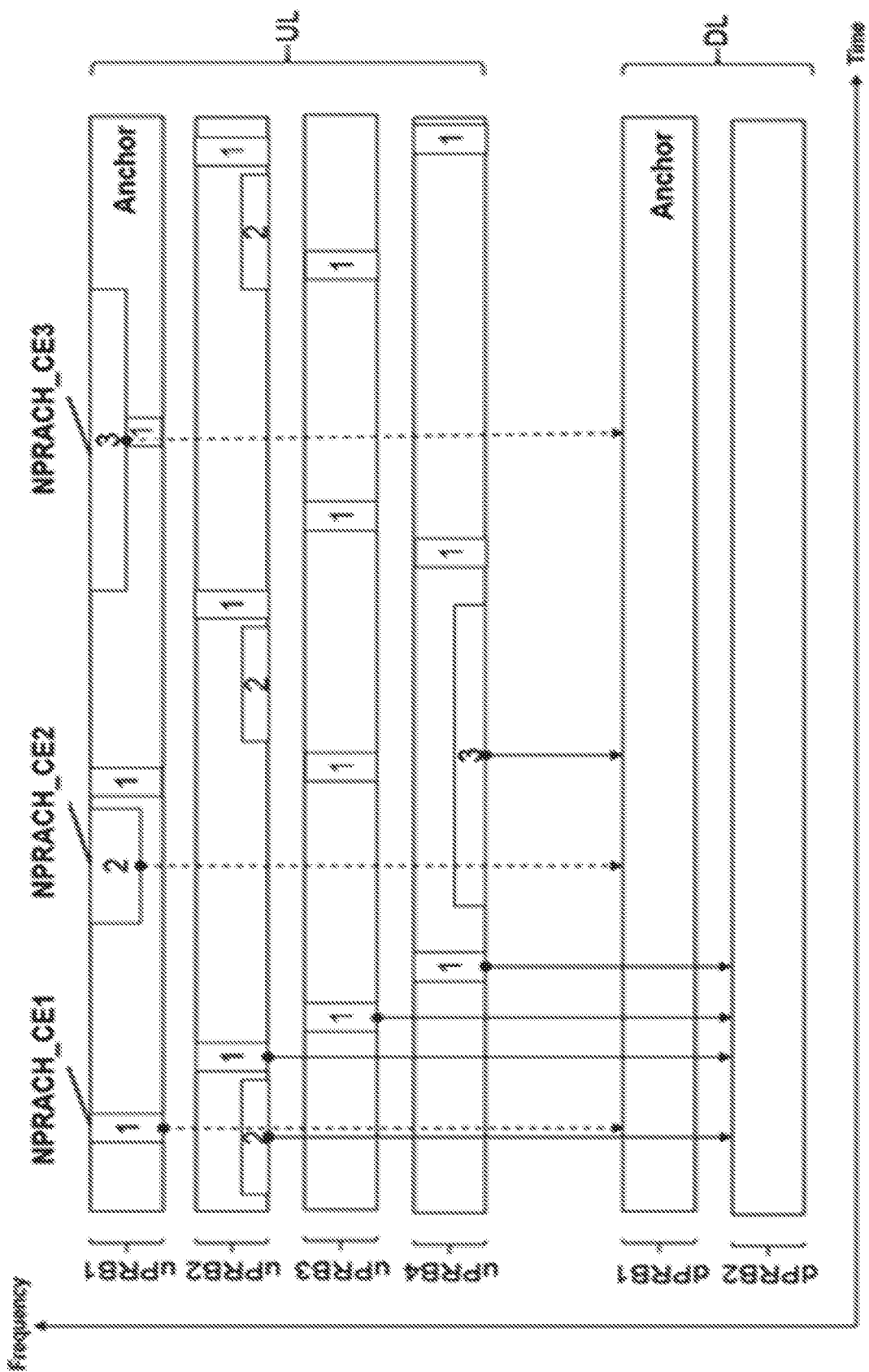
FIG. 7 is a block diagram of a mapping between random access resource and downlink carriers according to some embodiments.

FIG. 7 illustrates some embodiments for this signaling. FIG. 7 shows a frequency/time domain diagram. The Y-axis is frequency and X-axis is time. An NB-IoT cell utilizes one non-anchor carrier in the DL (dPRB2) and three non-anchor carriers in the UL (uPRB2, uPRB3, uPRB4), i.e. in total there are two DL carriers and four UL carriers used as there is always one anchor carrier per direction (dPRB1 and uPRB1). Each UL carrier contains 1-3 NPRACH resources for supporting different coverage enhancement levels shown as squares with the number indicating the CE-level 1-3. The size of the square in the time dimension (X-axis direction) corresponds to how many repetitions that are transmitted, i.e. the more repetitions the higher CE-level. The size of the square in the frequency dimension (Y-axis direction) corresponds to how large a part of the UL carrier/PRB that is allocated for the NPRACH transmissions (e.g. out of the 48 subcarriers, 12/24/36 or 48 can be allocated). From each NPRACH resource there is a line/arrow pointing to a DL carrier/PRB. This is one of the items where new signaling parameters are provided to the UE according to some embodiments. In some embodiments, parameters related to the dashed lines/arrows are not needed as these are always connected to the anchor carrier in case the NPRACH resource is used by Rel-13 UEs (i.e. they are signaled on SIB2-NB already according to Rel-13). In addition, to indicate parameters to derive the lines/arrows, additional information may be used to describe the common search space for the DL non-anchor carrier in order for the UE to be able to decode the NPDCCH correctly.

Consider now an embodiment for how the signaling may be provided in terms of syntax. As a baseline, the NPRACH resource configuration from Rel-13 is used (3GPP TS 36.331 rev 13.2.0). An extract of this is shown in FIG. 8 for reference.

According to some embodiments, the non-anchor carriers in a cell are signaled as a new list (similar to NPRACH-ParametersList-NB-r13 in FIG. 8) called NPRACH-ParametersList-NB-r14. This is shown in FIG. 9 where the bold text highlights the differences compared to the -r13 version in parameter names and also indicates the new parameters in some embodiments. For each of the NPRACH resources (i.e. each list entry) the NPRACH resource from the anchor carrier is used as a base i.e. an index to NPRACH-ParametersList-NB-r13 is provided. As maxNPRACH-Resources-NB-r13=3 corresponds to the 3 CE-levels, an index is needed and this is referred to as nprach-AnchorCarrierResourceIndex-r14. Then, in addition to this parameter all parameters that can differ from the anchor carrier NPRACH resource configuration are provided as optional parameters (denoted as "OPTIONAL—Need ON" after the parameter type). Thus, only delta configuration signaling is used, i.e. if the parameter is not present the parameter value from the referenced anchor carrier NPRACH resource is used. Note also, that the value range for the new optional Rel-14 parameters may differ from the Rel-13 version, so they are postfixed with "-r14" but the name is otherwise kept the same. Then finally, two new parameters that provide the UL non-anchor carrier configuration and the DL carrier configuration are provided as ul-NonAnchorCarrierConfigIndex-r14 and dl-NonAnchorCarrierConfigIndex-r14 respectively. For the latter, a similar delta configuration "signaling method" is used by having it optional where absence means that the anchor carrier DL configuration is used. Note that in this example it is an index to a list of non-anchor carrier configurations that is provided and the exact details of these configurations are not shown but it would consist of same/similar parameters as the existing configurations for non-anchor carriers signaled in Rel-13 as part of Msg4 within CarrierConfigDedicated-NB-r13, i.e. the parameter UL-CarrierConfigDedicated-NB-r13 for UL and the parameter DL-CarrierConfigDedicated-NB-r13 for DL. Thus, these parameters are included in the example below. As described above the search space configuration needs to be included for the non-anchor carrier in case it differs (e.g. due to different power boosting) and as can be seen below the parameters pre-fixed with "pdcch-" are included as part of this (if absent the same search space as used on the anchor carrier is used).

It should be noted that the above is one example of how the configuration may be signaled, but other variants exists and other new parameters may be present in the ASN.1 structure.

A possible embodiment of the network operation is as follows. The network determines how many UL/DL carrier resources that it will use by for example estimating the expected UL/DL traffic load in a cell, e.g. number of random access procedures including NPRACH transmissions of Msg1 and DL/UL transmissions for Msg2/Msg3/Msg4/Msg5, paging transmissions, SI transmissions and unicast transmissions. When determining the resources and configuration information, the possible output power for the carriers is included (i.e. if power boosting is applied on some carriers)

Parameters describing the UL and DL non-anchor carriers are then broadcasted so that UEs receiving the parameters can calculate on what non-anchor carriers Msg2/Msg3/Msg4 are to be transmitted given that a certain NPRACH resource is used for Msg1 transmission.

When the network correctly receives/decodes on a NPRACH resource on a non-anchor carrier, it will proceed with the transmissions/receptions of the Msg2/Msg3/Msg4 on carriers according to the configuration.

Some embodiments herein thereby enable transmission of random access related UL/DL related messages on different anchor/non-anchor carriers by providing on system information configuration parameters from the network to be used by the network and the UE as part of the random access procedure message transmission.

In view of the above modifications and variations, it will be appreciate that in some embodiments, the multiple different carriers which are configurable for the subsequent message 18 include an anchor carrier as well as a non-anchor carrier. Where the subsequent message 18 is Ms2, Ms3, or Ms4 in an LTE-based random access procedure, therefore, Ms2, Ms3, or Ms4 may be configured to be transmitted or received on a non-anchor carrier.

In some embodiments, the subsequent message 18 is to be transmitted or received on different carriers for at least two different possible random access resources on which the initial message is able to be transmitted or received. In this case, determining the carrier for the subsequent message 18 may comprise selecting, from among the different carriers 20, the carrier on which to transmit or receive the subsequent message 18, as a function of on which random access resource the initial message is transmitted or received.

In one embodiment, for example, the at least two different random access resources support different coverage enhancement levels for transmission of the initial message and/or the different carriers support different coverage enhancement levels for transmission of the subsequent message. Alternatively or additionally, the different carriers may differ in an extent to which the carriers are power boosted. In still other embodiments, the different carriers include an anchor carrier and a non-anchor carrier.

In one or more embodiments, the subsequent message 18 is to be transmitted or received on a first carrier when the initial message is transmitted or received on a random access resource configured for relatively poor radio coverage, and the subsequent message 18 is to be transmitted or received on a second carrier when the initial message is transmitted or received on a random access resource configured for relatively strong radio coverage. In one embodiment, for example, the first carrier is an anchor carrier and the second carrier is a non-anchor carrier. Alternatively or additionally, the first carrier is power boosted to a greater extent than the second carrier.

In any of the above embodiments, the subsequent message may be a downlink message or an uplink message.

In some embodiments, the radio network node 12 (e.g., a base station) transmits configuration information indicating configurability of the carrier to the wireless device 14. In some embodiments, the configuration information is included in broadcasted system information. In other embodiments, the configuration information is included in a different subsequent message that is a downlink message in the random access procedure 16 and that occurs prior to the subsequent message 18 in the sequence.

In any of the embodiments, the subsequent message 18 may be a random access response, a radio resource control (RRC) connection request, or a contention resolution message.

Note that in some embodiments, configurability of the carrier depends on an imbalance in a number of random access radio resources available on anchor and non-anchor carriers.

Alternatively or additionally, the random access procedure 16 may be performed for random access to a narrowband wireless communication system. In embodiment, for instance, the system 10 is an NB-IoT system.

A radio node herein is any type of node (e.g., a radio network node or wireless device) capable of communicating with another node over radio signals. A radio network node is any type of radio node within a wireless communication network, such as a base station. A network node is any type of node within a wireless communication network, whether a radio network node or not. A wireless device is any type of radio node capable of communicating with a radio network node over radio signals. A wireless device may therefore refer to a user equipment (UE), a machine-to-machine (M2M) device, a machine-type communications (MTC) device, a NB-IoT device, etc. However it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an internet of things (IoT) scenario, a wireless device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

Note that a radio node (e.g., radio network node 12 or wireless device 14) as described above may perform the method in any of FIGS. 2-3 and 5-6 and any other processing herein by implementing any functional means or units. In one embodiment, for example, the radio node comprises respective circuits or circuitry configured to perform the steps shown in any of FIGS. 2-3 and 5-6. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 10:
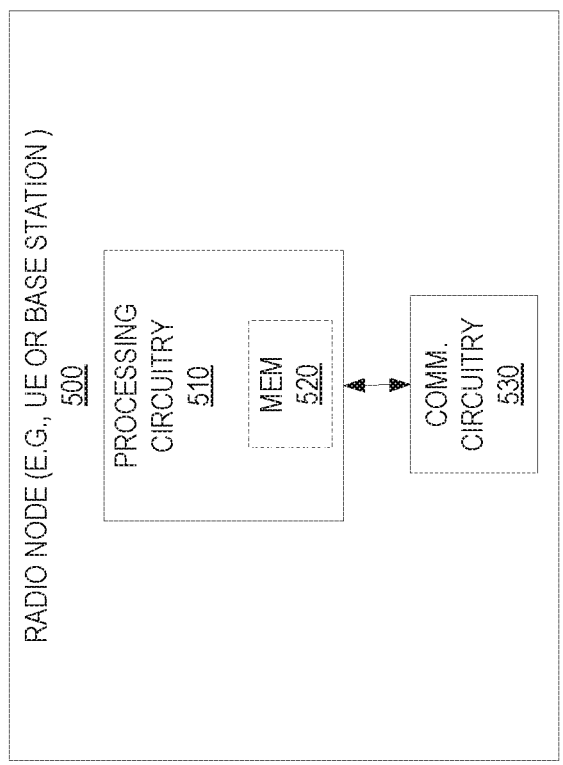
FIG. 10 is a block diagram of a radio node according to some embodiments.

FIG. 10 illustrates a radio node 500 implemented in accordance with one or more embodiments. As shown, the radio node 500 includes processing circuitry 510 and communication circuitry 530. The communication circuitry 530 is configured to transmit and/or receive information to and/or from one or more other nodes, e.g., via any communication technology. Such communication may occur via one or more antennas that are either internal or external to the radio node 500. The processing circuitry 510 is configured to perform processing described above, e.g., in any of FIGS. 2-3 and 5-6, such as by executing instructions stored in memory 520. The processing circuitry 510 in this regard may implement certain functional means, units, or modules.

Figure 11:
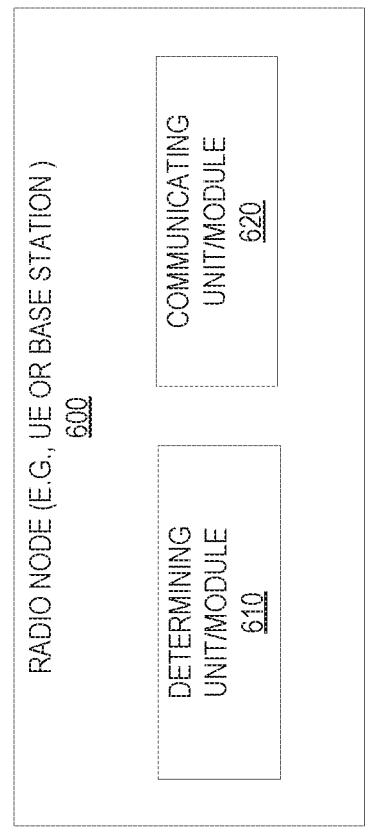
FIG. 11 is a block diagram of a radio node according to other embodiments.

FIG. 11 illustrates a radio node 600 implemented in accordance with one or more other embodiments. As shown, the radio node 600 implements various functional means, units, or modules, e.g., via the processing circuitry 510 in FIG. 10 and/or via software code. These functional means, units, or modules, e.g., for implementing the method in FIG. 2, include for instance a determining unit or module 610 for determining a carrier on which a subsequent message 18 in the random access procedure 16 is to be transmitted or received, from amongst multiple different carriers 20 which are configurable as said carrier. This determination in some embodiments may be based on configuration information 22 received from radio network node 12. Also included is a communication unit or module 620 for transmitting or receiving the subsequent message 18 on the determined carrier. The communication unit or module 620 may also be for receiving configuration information 22 in some embodiments.

In other embodiments, the radio node 600 alternatively includes functional means, units, or modules, e.g., for implementing the method in FIG. 3, such as a communication unit or module for transmitting to the wireless device 14 configuration information that indicates a carrier on which a downlink message 18 in the random access procedure 16 is to be received by the wireless device 14, from amongst multiple different carriers 20 which are configurable as said carrier, and for transmitting the downlink message 18 on the indicated carrier.

Those skilled in the art will also appreciate that embodiments herein further include corresponding computer programs.

A computer program comprises instructions which, when executed on at least one processor of a radio node, cause the radio node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a node, cause the node to perform as described above.

Embodiments further include a computer program product comprising program code portions for performing the steps of any of the embodiments herein when the computer program product is executed by a computing device. This computer program product may be stored on a computer readable recording medium.

The invention claimed is:

1. A method of performing a random access procedure for random access by a wireless device to a wireless communication system, wherein the random access procedure includes multiple messages in sequence, the method performed by the wireless device and comprising:
   receiving configuration information from a radio network node at the wireless device;
   transmitting, by the wireless device to the radio network node, an initial message in the sequence of the multiple messages of the random access procedure on a random access resource;
   responsive to the configuration information and the transmission of the initial message on the random access resource, determining, at the wireless device, a carrier on which a downlink message in the random access procedure is to be received by the wireless device, from amongst multiple different carriers which are configurable as said carrier, wherein the downlink message occurs in the random access procedure subsequent to said initial message in the sequence of the multiple messages of the random access procedure; and
   receiving, from the radio network node at the wireless device, the downlink message on the determined carrier;
   wherein the configuration information includes a list of one or more uplink non-anchor carrier random access resource configurations, wherein each uplink non-anchor carrier random access resource configuration indicates a downlink carrier configuration to be used for transmission of the downlink message if the uplink non-anchor carrier random access resource configuration is used for the transmission of the initial message; and
   wherein an uplink non-anchor carrier random access resource configuration indicates the downlink carrier configuration to be used as being a certain downlink non-anchor carrier configuration if the uplink non-anchor carrier random access resource configuration includes an index into a list of downlink non-anchor carrier configurations and as being a downlink anchor carrier configuration if the index is absent from the uplink non-anchor carrier random access resource configuration.

2. The method of claim 1, wherein the configuration information indicates, for each of one or more random access resources usable for the transmission of the initial message, a carrier to be used for the downlink message if that random access resource is used for the transmission of the initial message.

3. The method of claim 1, wherein receiving the configuration information comprises receiving the configuration information in broadcasted system information.

4. The method of claim 1, wherein the downlink message is a random access response or a contention resolution message.

5. The method of claim 1, wherein the multiple different carriers which are configurable as said carrier include an anchor carrier on which a synchronization signal and/or system information is transmitted, and one or more non-anchor carriers that each lacks a synchronization signal and/or system information.

6. The method of claim 1, wherein the wireless communication system is a narrowband internet of things (NB-IoT) system.

7. A method of performing a random access procedure for random access by a wireless device to a wireless communication system, wherein the random access procedure includes multiple messages in sequence, the method performed by a radio network node and comprising:
  transmitting configuration information from the radio network node to the wireless device;
  receiving, from the wireless device at the radio network node, an initial message in the sequence of the multiple messages of the random access procedure on a random access resource;
  wherein the configuration information indicates, for each of one or more random access resources usable for the initial message, a carrier to be used for a downlink message in the random access procedure if that random access resource is used for the reception of the initial message, from amongst multiple different carriers which are configurable as said carrier, wherein the downlink message occurs in the random access procedure subsequent to the reception of the initial message in the sequence; and
  transmitting the downlink message on the indicated carrier from the radio network node to the wireless device;
  wherein the configuration information includes a list of one or more uplink non-anchor carrier random access resource configurations, wherein each uplink non-anchor carrier random access resource configuration indicates a downlink carrier configuration to be used for transmission of the downlink message if the uplink non-anchor carrier random access resource configuration is used for transmission of the initial message; and
  wherein an uplink non-anchor carrier random access resource configuration indicates the downlink carrier configuration to be used as being a certain downlink non-anchor carrier configuration if the uplink non-anchor carrier random access resource configuration includes an index into a list of downlink non-anchor carrier configurations and as being a downlink anchor carrier configuration if the index is absent from the uplink non-anchor carrier random access resource configuration.

8. The method of claim 7, wherein the configuration information is included in broadcasted system information.

9. The method of claim 7, wherein the downlink message is a random access response or a contention resolution message.

10. The method of claim 7, wherein the multiple different carriers which are configurable as said carrier include an anchor carrier on which a synchronization signal and/or system information is transmitted, and one or more non-anchor carriers that each lacks a synchronization signal and/or system information.

11. The method of claim 7, wherein the wireless communication system is a narrowband internet of things (NB-IoT) system.

12. A wireless device configured for performing a random access procedure for random access to a wireless communication system, wherein the random access procedure includes multiple messages in sequence, the wireless device comprising:
  processing circuitry and a memory, the memory containing instructions executable by the processing circuitry whereby the wireless device is configured to:
    receive configuration information from a radio network node at the wireless device;
    transmit an initial message in the sequence of the multiple messages of the random access procedure on a random access resource to the radio network node;
    responsive to the configuration information and the transmission of the initial message on the random access resource, determine a carrier on which a downlink message in the random access procedure is to be received by the wireless device, from amongst multiple different carriers which are configurable as said carrier, based on configuration information received from a radio network node indicating said carrier, wherein the downlink message occurs in the random access procedure subsequent to an initial message in the sequence; and
    receive, from the radio network node at the wireless device, the downlink message on the determined carrier;
  wherein the configuration information includes a list of one or more uplink non-anchor carrier random access resource configurations, wherein each uplink non-anchor carrier random access resource configuration indicates a downlink carrier configuration to be used for transmission of the downlink message if the uplink non-anchor carrier random access resource configuration is used for transmission of the initial message; and
  wherein an uplink non-anchor carrier random access resource configuration indicates the downlink carrier configuration to be used as being a certain downlink non-anchor carrier configuration if the uplink non-anchor carrier random access resource configuration includes an index into a list of downlink non-anchor carrier configurations and as being a downlink anchor carrier configuration if the index is absent from the uplink non-anchor carrier random access resource configuration.

13. The wireless device of claim 12, wherein the configuration information indicates, for each of one or more random access resources usable for the transmission of the initial message, a carrier to be used for the downlink message if that random access resource is used for the transmission of the initial message.

14. The wireless device of claim 12, wherein the configuration information is included in broadcasted system information.

15. The wireless device of claim 12, wherein the downlink message is a random access response or a contention resolution message.

16. The wireless device of claim 12, wherein the multiple different carriers which are configurable as said carrier include an anchor carrier on which a synchronization signal and/or system information is transmitted, and one or more non-anchor carriers that each lacks a synchronization signal and/or system information.

17. The wireless device of claim 12, wherein the wireless communication system is a narrowband internet of things (NB-IoT) system.

18. A radio network node configured for performing a random access procedure for random access by a wireless device to a wireless communication system, wherein the random access procedure includes multiple messages in sequence, the radio network node comprising:
processing circuitry and a memory, the memory containing instructions executable by the processing circuitry whereby the radio network node is configured to:
transmit to the wireless device configuration information;
receive, from the wireless device, an initial message in the sequence of the multiple messages of the random access procedure on a random access resource;
wherein the configuration information indicates, for each of one or more random access resources usable for the initial message, a carrier to be used for a downlink message in the random access procedure if that random access resource is used for the initial message, from amongst multiple different carriers which are configurable as said carrier, wherein the downlink message occurs in the random access procedure subsequent to transmission of the initial message in the sequence; and
transmit the downlink message on the indicated carrier to the wireless device;
wherein the configuration information includes a list of one or more uplink non-anchor carrier random access resource configurations, wherein each uplink non-anchor carrier random access resource configuration indicates a downlink carrier configuration to be used for transmission of the downlink message if the uplink non-anchor carrier random access resource configuration is used for transmission of the initial message; and
wherein an uplink non-anchor carrier random access resource configuration indicates the downlink carrier configuration to be used as being a certain downlink non-anchor carrier configuration if the uplink non-anchor carrier random access resource configuration includes an index into a list of downlink non-anchor carrier configurations and as being a downlink anchor carrier configuration if the index is absent from the uplink non-anchor carrier random access resource configuration.

19. The radio network node of claim 18, wherein the configuration information is included in broadcasted system information.

20. The radio network node of claim 18, wherein the downlink message is a random access response or a contention resolution message.

21. The radio network node of claim 18, wherein the multiple different carriers which are configurable as said carrier include an anchor carrier on which a synchronization signal and/or system information is transmitted, and one or more non-anchor carriers that each lacks a synchronization signal and/or system information.

22. The radio network node of claim 18, wherein the wireless communication system is a narrowband internet of things (NB-IoT) system.

* * * * *